Aug. 23, 1955 E. A. AAS 2,716,211
THYRATRON TRIGGER CIRCUIT FOR DISCHARGING A CAPACITOR
Filed April 30, 1953
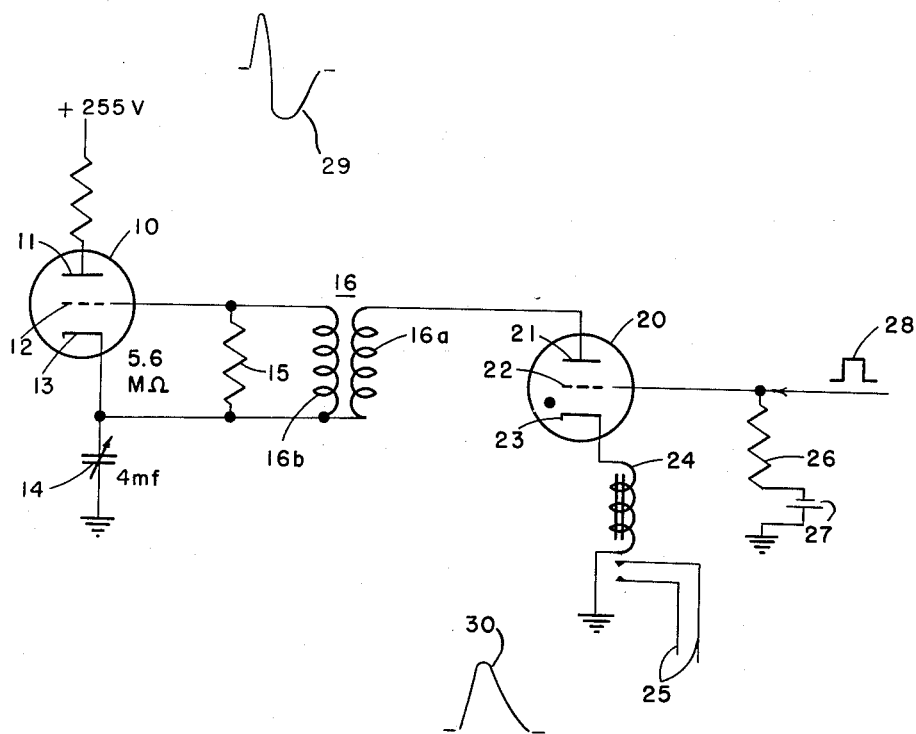
INVENTOR.
E. A. AAS
BY Roland A. Anderson
ATTORNEY

2,716,211

THYRATRON TRIGGER CIRCUIT FOR DISCHARGING A CAPACITOR

Eugene A. Aas, Albuquerque, N. Mex., assignor, by mesne assignments, to the United States of America as represented by the United States Atomic Energy Commission Application April 30, 1953, Serial No. 352,110

4 Claims. (Cl. 320—1)

This invention relates to an improved electrical trigger circuit, capable of repetitively deriving strong current pulses of long duration. These pulses are applicable to effect successive operations of a load circuit which may be, for example, a relay of which the inertia is considerable. The winding of such a relay may require a current pulse of 50 milliamperes for an interval of 25 milliseconds; such a pulse could not readily be obtained from the circuits of the prior art.

A general object of the invention is therefore to provide a trigger circuit for the derivation of current pulses of high current and long duration.

The circuit to be described makes use of short pulses repetitively applied to fire a thyratron and elicit therefrom a current pulse which may last for any time interval shorter than the period of application of the instigating pulses, and the provision of such a circuit is another object of the invention.

Specifically, an object of the invention is to provide a circuit in which a large condenser is enabled to charge quickly through a low impedance, and when desired is slowly discharged through a second path consisting of a gaseous device and through a load, during which the former low charging impedance is changed to a high impedance so that gaseous conduction will cease at the end of discharge.

Referring now to the drawing, the single figure of which exhibits a preferred embodiment of the invention, numeral 10 designates a vacuum tube which may be single, as shown, or double, as a 6SL7 with joined grids. Of tube 10, anode 11 is supplied with 255 volts from a source of positive voltage, cathode 13 is in series with 4 microfarad condenser 14 to ground and is connected to grid 12 by 5.6 megohm resistor 15. With this connection of cathode and grid, those two electrodes are constantly at the same potential and tube 10 the source rapidly charges condenser 14.

Grid 12 and cathode 13 are also conductively connected by the secondary winding 16b of transformer 16, the primary winding 16a of which is connected between cathode 13 and anode 21 of thyratron 20. Tubes 10 and 20 are normally conducting and nonconducting respectively. The capacitance of condenser 14 is variable, as shown, the value 4 microfarads being suitable with the illustrative circuit shown for the production of a circuit pulse 30 of duration about 25 milliseconds and of amplitude about 50 milliamperes. These quantities are controllable by varying the capacitance of condenser 14 for a given path to ground.

Thyratron 20 is provided with the customary electrodes, of which the grid 22 is normally held negative by 10 volt battery 27 through resistance 26 and cathode 23 is connected to ground through a load circuit, symbolized in the figure by winding 24 of a relay adapted to operate contacts to close a circuit through conductors 25.

A positive firing pulse 28 may be capacitively applied to grid 22 of tube 20. When this happenes tube 20 becomes conducting, affording a low impedance path for the discharge of condenser 14 through the primary winding 16a of transformer 16, the anode-cathode path of tube 20 and winding 24 to ground.

The anode 21 current decays exponentially with decreasing charge of condenser 14. Through transformer 16 this current, by suitable connection of secondary winding 16b, is applied as a negative voltage pulse 29 to grid 12 of tube 10 to cut it off toward the end of condenser 14 discharge, and permit tube 20 to deionize.

At this point the thyratron is conducting current by the discharge of condenser 14, a current which decreases exponentially with time. The anode voltage of the thyratron is similarly decreasing and eventually falls to extinguish the thyratron current. During this period the decreasing current traverses winding 24 and the corresponding cathode voltage likewise decays exponentially as indicated at 30.

Pulse 29 similarly decays in magnitude and vanishes simultaneously with pulse 30. With the vanishing of pulse 29 tube 10 again conducts, and its anode voltage supply rapidly renews the charge of condenser 14, which awaits another trigger pulse 28 to repeat its discharge. Since grid 12 and cathode 13 of tube 10 are maintained at the same potential by resistor 15, this changing voltage across condenser 14 produces no effect on the cutoff condition of tube 10. It is easily possible to control the duration of the current pulse in winding 24 by controlling the capacitance of condenser 14, which may be made variable for this purpose. The voltage to which this condenser is initially charged is well above that needed on anode 21 when the thyratron is first fired, and the greater the capacitance of condenser 14 the longer it will take for the plate voltage of thyratron 20 to fall to "deionize" potential for the grid bias imposed by battery 27.

It will be clear that pulse 28 is effective to initiate the discharge of condenser 14 and simultaneously to cutoff tube 10, thus the circuit of the invention effects rapid charging of condenser 14 through a path of low impedance and the discharging of this condenser through another path of low impedance at the same time the charging path is blocked from the power source by a high impedance to insure that the thyratron stops conducting at the end of discharge.

Obviously, the values of voltage, current, capacitance and time above given are solely illustrative. It is only necessary that the discharge time allowed be slightly less than the interval between successive pulses 28. Individual pulses 28 may be as short as desired and it has been found easy so to arrange the circuit that the frequency of pulses 28 may be 5000 per second. So high a frequency of course calls for a load circuit responsive to a pulse 30 lasting less than half a millisecond.

Numerous applications of the invention will readily occur to the reader, and various revisions of the circuit shown may be made within the scope of the invention, which provides means to rapidly charge a condenser and then more slowly discharge it with simultaneous disablement of the charging means.

I claim:

1. An electrical circuit adapted for repetitively directly charging and subsequently discharging through a load circuit a variable condenser comprising normally enabled charging means including a thermionic vacuum tube having an anode, a control grid and a cathode in series with which to ground is the condenser, a source of positive voltage applied to the anode, the cathode and the control grid being resistively connected, a normally disabled thyratron having an anode, a control grid and a cathode, a transformer having two windings of which the one is connected between the cathode and the grid of the vacuum tube and the other between the cathode of the vacuum tube and the anode of the thyratron, the load circuit being connected in series between ground and the cathode of the thyratron, and means for repetitively enabling the thyratron.

2. Electrical means for charging a variable condenser and thereafter discharging the same through a load circuit comprising normally enabled electrical means for charging the condenser, normally disabled electrical means for discharging the electrical condenser through the load circuit, electrical means for normally maintaining the disablement of the second named means, said maintaining means being adapted to be counteracted by the application of an electrical voltage pulse whereupon the normally disabled means is permitted to discharge the condenser through the load circuit and means interconnecting the charging and the discharging means including a transformer having two windings of which one is in series between the condenser and the discharging means and the other winding is arranged to apply to the charging means a disabling voltage during the discharge of the condenser and ceasing therewith.

3. Electrical means as in claim 2 in which the normally enabled means comprises a thermionic vacuum tube having an anode, a control grid and a cathode, the condenser being in series between cathode and ground and resistively connected at its junction with the cathode to the control grid and to a terminal of each winding of the transformer.

4. Electrical means as in claim 3 in which the normally disabled means comprises a thyratron having an anode, a control grid and a cathode, the anode being connected in series with the one winding of the transformer to the plate of the condenser remote from ground while the cathode is in series with the load circuit to ground and the grid is normally maintained negative to ground.

References Cited in the file of this patent
UNITED STATES PATENTS 2,404,971      Mahoney et al. _____ July 30, 1946